United States Patent
Oh et al.

(10) Patent No.: US 7,460,192 B2
(45) Date of Patent: Dec. 2, 2008

(54) LIQUID CRYSTAL DISPLAY, THIN FILM DIODE PANEL, AND MANUFACTURING METHOD OF THE SAME

(75) Inventors: Joon-Hak Oh, Seoul (KR);
Chong-Chul Chai, Seoul (KR);
Kyong-Ju Shin, Yongin-si (KR);
Jin-Hong Kim, Yongin-si (KR);
Sung-Jin Hong, Seoul (KR)

(73) Assignee: Samsung Electronics Co., Ltd. (KR)

(*) Notice: Subject to any disclaimer, the term of this patent is extended or adjusted under 35 U.S.C. 154(b) by 265 days.

(21) Appl. No.: 10/954,010

(22) Filed: Sep. 29, 2004

(65) Prior Publication Data

US 2005/0105010 A1    May 19, 2005

(30) Foreign Application Priority Data

Nov. 18, 2003    (KR)    ............ 10-2003-0081535

(51) Int. Cl.
*G02F 1/136* (2006.01)

(52) U.S. Cl. .................. 349/50; 349/51; 349/52

(58) Field of Classification Search ......... 349/50–52, 349/141, 143
See application file for complete search history.

(56) References Cited

U.S. PATENT DOCUMENTS

| | | | | |
|---|---|---|---|---|
| 5,854,616 A | * | 12/1998 | Ota et al. | 345/100 |
| 5,969,782 A | | 10/1999 | Lee et al. | |
| 6,160,600 A | * | 12/2000 | Yamazaki et al. | 349/138 |
| 6,225,968 B1 | * | 5/2001 | den Boer et al. | 345/91 |
| 6,297,867 B1 | | 10/2001 | Miyahara et al. | |
| 6,424,399 B1 | * | 7/2002 | Shimada et al. | 349/147 |
| 6,456,350 B1 | | 9/2002 | Ashizawa et al. | |
| 6,784,966 B2 | * | 8/2004 | Maeda et al. | 349/141 |
| 6,967,637 B2 | * | 11/2005 | Aoyama et al. | 345/94 |
| 2004/0189885 A1 | * | 9/2004 | Song | 349/50 |

FOREIGN PATENT DOCUMENTS

| | | |
|---|---|---|
| JP | 11249177 | 9/1999 |
| JP | 2000355595 | 12/2000 |
| JP | 2001-100228 * | 4/2001 |
| JP | 2002-123227 | 4/2002 |
| JP | 2003-075850 | 3/2003 |
| KR | 1999-0045227 | 6/1999 |
| KR | 1999-0088122 | 12/1999 |
| KR | 1020000031956 | 6/2000 |
| KR | 1020010081251 | 8/2001 |
| KR | 100372577 | 2/2003 |
| KR | 100380222 | 4/2003 |

* cited by examiner

*Primary Examiner*—David C. Nelms
*Assistant Examiner*—Hoan C Nguyen
(74) *Attorney, Agent, or Firm*—F. Chau & Associates, LLC

(57) ABSTRACT

A thin film diode panel comprises a pixel electrode formed on a substrate, the pixel electrode including a stem portion and a plurality of branch portions extended from the stem portion, and a data electrode line formed on the substrate, the data electrode line including a plurality of branch electrodes formed parallel to the plurality of branch portions. The plurality of branch portions may extend in a direction perpendicular to the stem portion and the plurality of branch electrodes may extend in a direction perpendicular to the data electrode line.

12 Claims, 15 Drawing Sheets

Rubbing Direction

LIQUID CRYSTAL DISPLAY, THIN FILM DIODE PANEL, AND MANUFACTURING METHOD OF THE SAME

BACKGROUND OF THE INVENTION (a) Technical Field

The present disclosure relates to thin film diode array panels using metal insulator metal (MIM) diodes as switching elements, and a manufacturing method of the same. In more detail, the present disclosure relates to thin film diode array panels of a dual select diode (DSD) type, and a liquid crystal display using the same.

(b) Discussion of the Related Art

A liquid crystal display (LCD) is one of the most widely used flat panel displays. An LCD includes two panels provided with field-generating electrodes, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

An LCD may have switching elements to switch voltages of pixels arranged in a matrix form. An LCD can display various images since pixel voltages are individually switched. An LCD having switching elements to switch pixel voltages individually is called as an active matrix type LCD.

Thin film transistors or thin film diodes may be used as the switching elements. When thin film diodes are applied, MIM diodes can be used.

A MIM diode has two metal layers and one insulating layer interposed between the metal layers and a thickness capable of being measured in micrometers. A MIM diode may act as a switch due to the electrical nonlinearity of the insulating layer. A MIM diode has two terminals. As a result, the manufacturing process of the MIM diode is simpler than that of the thin film transistor having three terminals. Accordingly, MIM diodes can be manufactured at a lower cost than thin film transistors.

However, when diodes are used as switching elements, the uniformity of image quality and contrast ratio may be degraded due to asymmetry of an applied voltage with respect to the polarity.

In response to the asymmetry, a dual select diode (DSD) type panel has been developed. A DSD type panel includes two diodes which are symmetrically connected to a pixel electrode and are driven by applying voltages of opposite polarities.

A DSD type LCD shows improved image quality, contrast ratio, gray scale uniformity, and response speed by applying voltages having opposite polarities to the two diodes which are connected to a same pixel electrode. Accordingly, a DSD type LCD can display images with high resolution like that of an LCD using thin film transistors.

In a conventional DSD type LCD, scanning signal lines, diodes, and pixel electrodes are formed on a lower substrate, and image signal stripes are formed on an upper substrate. Therefore, scanning signal drivers are connected to the lower substrate and image signal drivers are connected to the upper substrate.

Known structures of DSD type LCDs make it difficult to load driver integrated circuits (ICs). Further, conventional DSD type LCDs do not provide for the wide viewing angles that are becoming more important as the size of a display increases.

SUMMARY OF THE INVENTION

A panel for a liquid crystal display device, in accordance with an embodiment of the present invention, comprises a pixel electrode formed on a substrate, the pixel electrode including first and second contact portions, a stem portion and a plurality of branch portions extended from the stem portion, a data electrode line formed on the substrate, the data electrode line including is a plurality of branch electrodes aligned parallel to the plurality of branch portions, a first input electrode formed on the substrate adjacent the first contact portion, a second input electrode formed on the substrate adjacent the second contact portion, a first floating electrode formed on the substrate, wherein the first floating electrode crosses the first input electrode and the first contact portion, and a second floating electrode formed on the substrate, wherein the second floating electrode crosses the second input electrode and the second contact portion.

Each branch portion of the plurality of branch portions may be alternately disposed with a branch electrode of the plurality of branch electrodes. The panel may further comprise a first channel insulating layer disposed between the first floating electrode and the first input electrode and the first contact portion, and a second channel insulating layer disposed between the second floating electrode and the second input electrode and the second contact portion. The first and second channel insulating layers, the first and second floating electrodes, the first and second input electrodes and the first and second contact portions may form respective first and second MIM diodes which are symmetrically connected to the pixel electrode.

First and second scanning signal lines may be formed on the substrate, wherein a portion of the first and second input electrodes respectively overlap the first and second scanning signal lines and the first and second input electrodes are respectively electrically connected to the first and second scanning signal lines.

An inter-insulating layer may be formed on the first and second floating electrodes, the pixel electrode, the first and second input electrodes and the first and second scanning signal lines, and the data electrode line may be formed on the inter-insulating layer. The inter-insulating layer may include a plurality of contact holes for exposing portions of the first and second scanning signal lines. The pixel electrode may further include an overlapping portion extended from the stem portion and the data electrode line may further include a storage electrode connected thereto, wherein the storage electrode overlaps the overlapping portion to form a storage capacitor and an inter-insulating layer is disposed between the storage electrode and the overlapping portion.

The plurality of branch portions may extend in a direction perpendicular to the stem portion and the plurality of branch electrodes may extend in a direction perpendicular to the data electrode line. The stem portion may extend in a longitudinal direction.

The first and second input electrodes may branch out from the first and second scanning signal lines, respectively. The inter-insulating layer may be formed on the overlapping portion of the pixel electrode and portions of the first and second scanning signal lines. The data electrode line may be formed on the inter-insulating layer.

A panel for a liquid crystal display device, in accordance with an embodiment of the present invention, comprises a pixel electrode formed on a substrate, the pixel electrode including a frame portion, first and second contact portions extended from the frame portion and a branch portion extended from the frame portion, a data electrode line formed on the substrate, the data electrode line including a plurality of branch electrodes aligned parallel to the branch portion, a first input electrode formed on the substrate adjacent the first contact portion, a second input electrode formed on the substrate adjacent the second contact portion, a first floating electrode formed on the substrate, wherein the first floating electrode crosses the first input electrode and the first contact portion, and a second floating electrode formed on the substrate, wherein the second floating electrode crosses the second input electrode and the second contact portion.

Each branch electrode of the plurality of branch electrodes may be positioned at a predetermined distance from the branch portion and the frame portion and may be disposed between the branch portion and the frame portion.

An insulating layer may be formed on the substrate to cover the pixel electrode, the first and second scanning signal lines, and the first and second input electrodes. The data electrode line may be formed on the insulating layer and a thickness of the insulating layer may be increased at a crossing portion of the data electrode line with the first and second scanning signal lines. The data electrode line may further include a storage electrode connected thereto and formed on the insulating layer, the pixel electrode may further include an overlapping portion formed by expansion of part of the frame portion, and a thickness of the insulating layer may be increased in an area between the overlapping portion and the storage electrode. The first and second floating electrodes may be formed on the insulating layer. The insulating layer may be disposed between the first and second scanning signal lines and the data electrode line, between the overlapping portion and the storage electrode, and between the first and second floating electrodes and the first and second input electrodes and the first and second contact portions. The insulating layer, the first and second floating electrodes, the first and second input electrode and the first and second contact portions may form respective first and second MIM diodes symmetrically connected to the pixel electrode. The insulating layer may include a plurality of contact holes for exposing portions of the first and second scanning signal lines.

A subsidiary insulating layer may be formed on a portion of the insulating layer. The data electrode line may be formed on the subsidiary insulating layer, and the subsidiary insulating layer may be disposed between the first and second scanning signal lines and the data electrode line and between the overlapping portion and the storage electrode.

The branch portion may extend in a direction parallel to a longitudinal portion of the frame portion and the plurality of branch electrodes may extend in a direction parallel to the data electrode line. The frame portion may have a rectangular shape.

A thin film diode panel for a liquid crystal display device, in accordance with an embodiment of the present invention, comprises a pixel electrode formed on a substrate, the pixel electrode including first and second contact portions, and a data electrode line formed on the substrate, the data electrode line including a plurality of branch electrodes.

The pixel electrode may further include a stem portion, a plurality of upper branch portions and a plurality of lower branch portions extending from the stem portion. The plurality of upper branch portions may extend from the stem portion at an angle ranging from about 7 degrees to about 23 degrees with respect to an axis perpendicular to the stem portion and the plurality of lower branch portions extend from the stem portion at an angle ranging from about −7 degrees to about −23 degrees with respect to the axis perpendicular to the stem portion. The plurality of branch electrodes may include upper and lower branch electrodes positioned parallel to the upper and lower branch portions, respectively. Each branch portion of the plurality of upper and lower branch portions may be alternately disposed with a branch electrode of the plurality of branch electrodes. An alignment layer may be formed on the panel, and the upper and lower branch portions and the upper and lower branch electrodes may be slanted against a rubbing direction of the alignment layer.

The pixel electrode may further include a first overlapping portion extending from the stem portion and decreasing in width in a direction away from the stem portion, and a second overlapping portion extending from the stem portion and increasing in width in the direction away from the stem portion. The data electrode line may include first and second storage electrodes connected thereto and overlapping with the first and second overlapping portions to form first and second storage capacitors.

The pixel electrode may further include a frame portion and a branch portion extended from the frame portion, the data electrode line may include a plurality of branch electrodes, and the frame portion, the branch portion and the branch electrodes may each include a plurality of adjacent bent sections. An angle of a bent section may range from about 15 degrees to about 45 degrees with respect to an axis formed by an adjacent bent section. The frame portion, the branch portion and the branch electrodes may be slanted against a rubbing direction of the alignment layer.

A method for manufacturing a panel of a liquid crystal display, in accordance with an embodiment of the present invention, comprises forming a conductive material layer on a substrate and photo-etching the conductive material layer to form a pixel electrode including first and second contact portions, a first input electrode adjacent the first contact portion and a second input electrode adjacent the second contact portion, depositing a silicon nitride layer on the substrate and photo-etching the silicon nitride layer to form a first channel insulating layer on the first input electrode and the first contact portion, and to form a second channel insulating layer on the second input electrode and the second contact portion, depositing a metal layer on the substrate and photo-etching the metal layer to form a first floating electrode crossing the first input electrode and the first contact portion, a second floating electrode crossing the second input electrode and the second contact portion, and first and second scanning signal lines, depositing an insulating layer on the substrate and photo-etching the insulating layer to form an inter-insulating layer on the first and second floating electrodes, the pixel electrode, the first and second input electrodes and the first and second scanning signal lines, and depositing a metal layer on the substrate and photo-etching the metal layer to form a data electrode line on the inter-insulating layer.

A method for manufacturing a panel of a liquid crystal display, in accordance with an embodiment of the present invention, comprises forming a conductive material layer on a substrate and photo-etching the conductive material layer to form a pixel electrode including first and second contact portions and an overlapping portion, a first input electrode adjacent the first contact portion, a second input electrode adjacent the second contact portion, and first and second scanning signal lines, depositing a silicon nitride layer on the substrate and photo-etching the silicon nitride layer to form an insulating layer on the first input electrode and the first contact portion, and on the second input electrode and the second contact portion, and depositing a metal layer on the substrate and photo-etching the metal layer to form a first floating electrode crossing the first input electrode and the first contact portion, a second floating electrode crossing the second input electrode and the second contact portion, and a data electrode line.

The insulating layer may include first and second channel layers respectively formed on the first and second input electrodes and the first and second contact portions, and the first and second floating electrodes may be respectively formed on the first and second channel insulating layers.

The method may further comprise depositing a layer including an insulator on the substrate and photo-etching the insulating layer to form an inter-insulating layer on the overlapping portion of the pixel electrode and on a portion of the first and second scanning signal lines, wherein the data electrode line is formed on the inter-insulating layer. The method may also comprise coating a photoresist film on the insulating layer, and exposing the photoresist film to light through a mask including a slit or lattice pattern or through a semitransparent film.

A liquid crystal display device, in accordance with an embodiment of the present invention, comprises a thin film diode panel including a pixel electrode formed on a substrate, the pixel electrode including a stem portion and a plurality of branch portions extended from the stem portion, and a data electrode line formed on the substrate, the data electrode line including a plurality of branch electrodes formed parallel to the plurality of branch portions, and a color filter panel positioned opposite the thin film diode panel, wherein a gap is formed between the thin film diode and color filter panels for housing a liquid crystal layer in the gap.

Liquid crystal molecules of the liquid crystal layer deposited in the gap may be aligned to be parallel with the plurality of branch portions and the plurality of branch electrodes in the absence of an electric field between the thin film diode and color filter panels.

BRIEF DESCRIPTION OF THE DRAWINGS

Preferred embodiments of the present invention can be understood in more detail from the following descriptions taken in conjunction with the accompanying drawings, in which.

DETAILED DESCRIPTION OF THE PREFERRED EMBODIMENTS

Preferred embodiments of the present invention now will be described more fully hereinafter with reference to the accompanying drawings, in which preferred embodiments of the invention are shown. The present invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
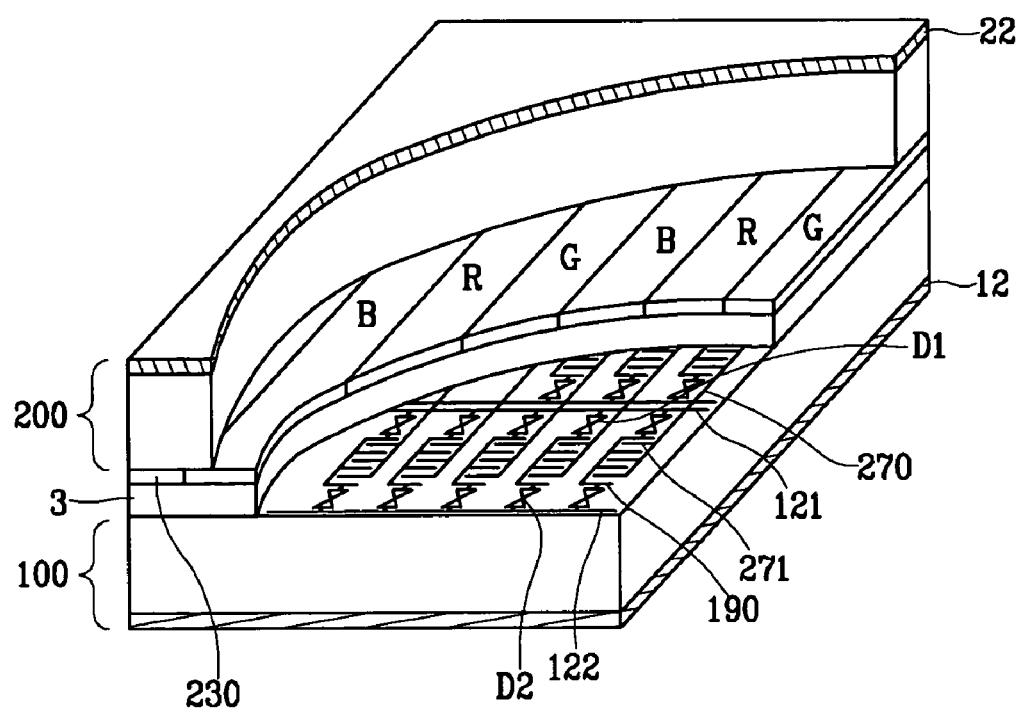
FIG. 1 is a perspective view of a liquid crystal display according to an embodiment of the present invention.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. FIG. 1 is a perspective view of a liquid crystal display according to an embodiment of the present invention.

As shown in FIG. 1, the liquid crystal display has a lower panel (a thin film diode array panel) 100, an upper panel (a color filter array panel) 200 facing the lower panel 100, an upper and lower polarizing films 22 and 12, and a liquid crystal layer 3 interposed between the two panels 100 and 200 and having liquid crystal molecules aligned in a horizontal direction with respect to the surfaces of the panels 100 and 200.

The lower panel 100 has a plurality of pixel electrodes 190 formed on corresponding regions with red, green, and blue pixels; a plurality of pairs of gate lines 121 and 122 transmitting signals having opposite polarity; and a plurality of pairs of MIM diodes D1 and D2 which are switching elements. The lower panel 100 also includes a plurality of data electrode lines 270 having a plurality of branch electrodes 271. Pixel areas are defined by the intersection of the data electrode lines 270 with the pair of gate lines 121 and 122.

The upper panel 200 includes a plurality of red, green, and blue color filters 230 which respectively correspond with pixel areas to define red, green, and blue pixel areas. White pixel areas on which no color filter is formed may be included.

The structure of the thin film diode array panel according to an embodiment of the present invention will be described in more detail.

Figure 2:
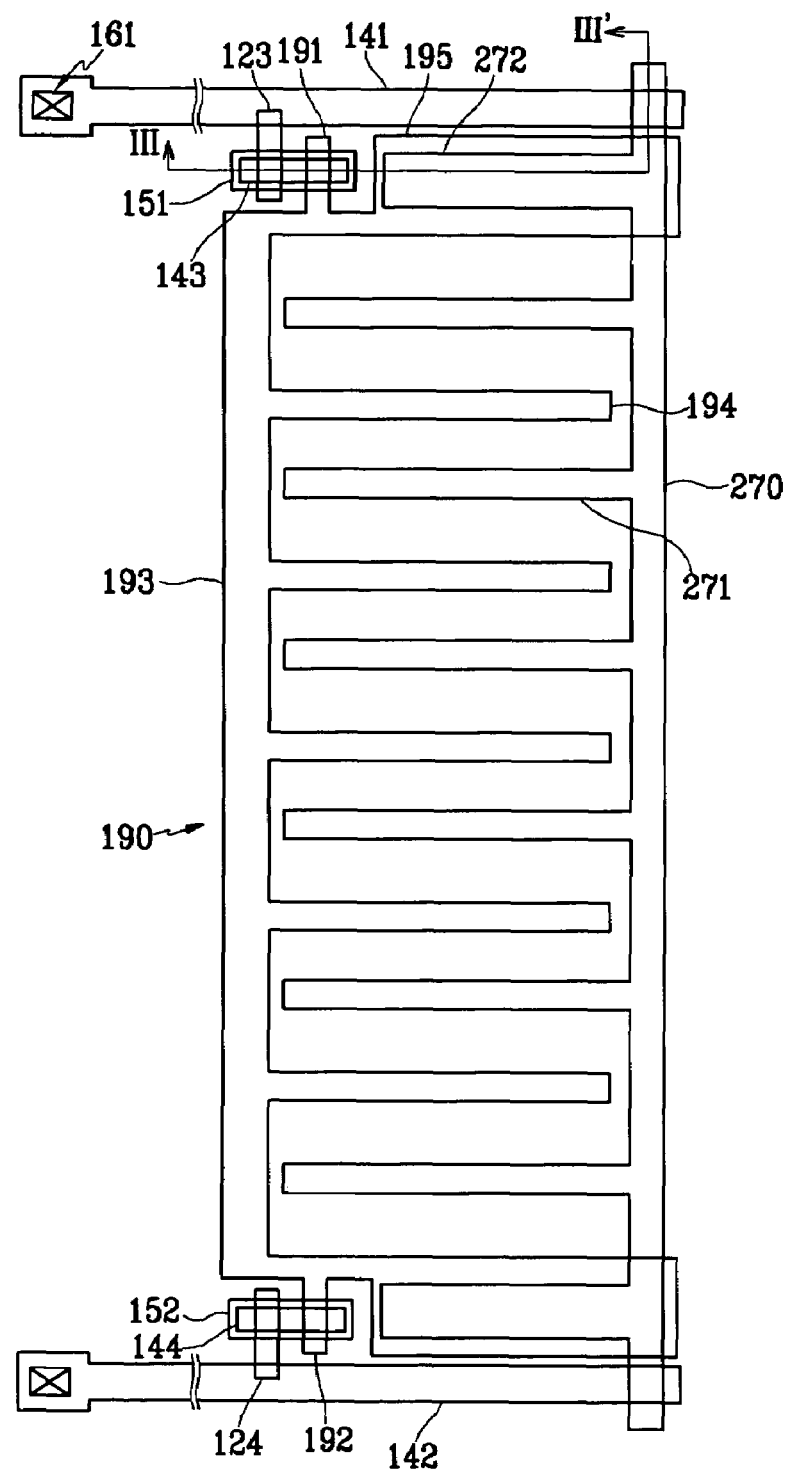
FIG. 2 is a layout view of a thin film diode array panel for a liquid crystal display according to an embodiment of the present invention.
Figure 3:
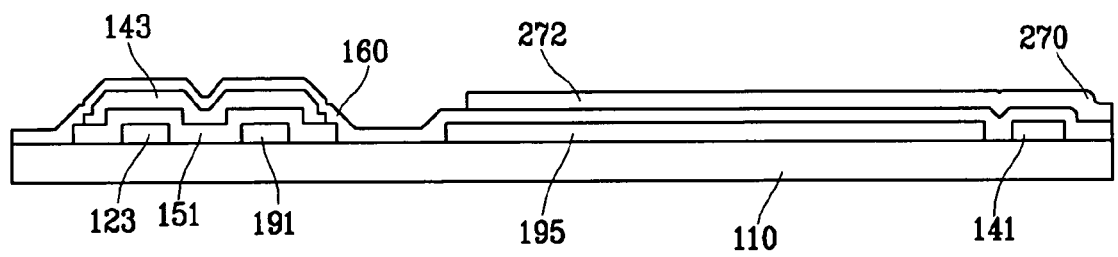
FIG. 3 is a sectional view of the thin film diode array panel taken along the line III-III' of FIG. 2 according to an embodiment of the present invention.

FIG. 2 is a layout view of a thin film diode array panel for a liquid crystal display according to an embodiment of the present invention. FIG. 3 is a sectional view of the thin film diode array panel taken along the line III-III' of FIG. 2.

As shown in FIGS. 2 and 3, a pixel electrode 190 includes first and second contact portions 191 and 192 and is formed on a transparent insulating substrate 110 such as a glass along with first and second input electrodes 123 and 124.

The pixel electrode 190 further includes a stem portion 193 extended in a longitudinal direction, branch portions 194 extended from the stem portion 193 in a transverse direction, and overlapping portions 195 having an increased width extended from the stem portion 193 in a transverse direction.

The first input electrode 123 is adjacent to the first contact portion 191 with a predetermined gap therebetween. The second input electrode 124 is adjacent to the second contact portion 192 with a predetermined gap therebetween.

The pixel electrode 190 and the first and second input electrodes 123 and 124 may be made of an opaque conductive material such as chromium (Cr), aluminum (Al), molybdenum (Mo), tantalum (Ta), and their alloys, as well as a transparent conductive material such as indium-tin-oxide (ITO) and indium-zinc-oxide (IZO).

A plurality of first channel insulating layers 151 are locally formed on the first input electrodes 123 and the first contact portions 191 of the plurality of pixel electrodes 190. A plurality of second channel insulating layers 152 are locally formed on the second input electrodes 124 and the second contact portions 192 of the plurality of pixel electrodes 190. The first and second channel insulating layers 151 and 152 are made of an insulating material such as silicon nitride (SiNx).

A plurality of first and second floating electrodes 143 and 144 are respectively formed on the first and second channel insulating layers 151 and 152. The first floating electrode 143 crosses the first input electrode 123 and the first contact portion 191. The second floating electrode 144 crosses the second input electrode 124 and the second contact portion 192.

A plurality of first and second scanning signal lines 141 and 142 extending in a transverse direction are formed on the insulating substrate 110. The first and second scanning signal lines 141 and 142 are respectively overlapped by a portion of the first and second input electrodes 123 and 124 and are respectively electrically connected to the first and second input electrodes 123 and 124.

The first and second scanning signal lines 141 and 142 and the first and second floating electrodes 143 and 144 are formed of the same material, such as chromium (Cr), aluminum (Al), molybdenum (Mo), tantalum (Ta), and their alloys.

An inter-insulating layer 160 is formed on the first and second floating electrodes 143 and 144, the pixel electrode 190, the first and second input electrodes 123 and 124, and the first and second scanning signal lines 141 and 142.

A plurality of data electrode lines 270 are formed on the inter-insulating layer 160. A data electrode line 270 includes a plurality of branch electrodes 271 and storage electrodes 272.

A branch electrode 271 is formed to be parallel with the branch portion 194 of the pixel electrode 190. The branch electrode 271 and the branch portion 194 are alternately disposed.

The storage electrode 272 overlaps the overlapping portion 195 of the pixel electrode 190 to form a storage capacitor.

In the above described thin film diode array panel, a pair of input electrodes 123 and 124, a pair of channel insulating layers 151 and 152, a pair of floating electrodes 143 and 144, and a pair of contact portions 191 and 192 form a pair of MIM diodes. Such a MIM diode performs a diode function by using nonlinearity of current-voltage characteristics of the first and second channel insulating layers 151 and 152. The MIM diodes allow a signal voltage to pass and be applied to the pixel electrode only when a voltage over a predetermined value is applied between the first and the second scanning signal lines 141 and 142. On the other hand, when no voltage is applied between the first and the second scanning signal lines 141 and 142, the MIM diodes are open circuits. Accordingly, a signal voltage applied between the pixel electrode 190 and the data electrode line 270 is preserved in the liquid crystal capacitor formed between the pixel electrode 190 and the data electrode line 270.

The upper panel 200 has a light blocking layer (not illustrated) and color filters 230. The upper panel 200 may further have an overcoat layer covering the color filters 230.

When no electric field is applied, liquid crystal molecules of the liquid crystal layer 3 are aligned to be parallel with the branch electrodes 271 and the branch portions 194. When a horizontal electric field is formed in the liquid crystal layer 3 by applying a voltage between the pixel electrode 190 and the data electrode line 270, liquid crystal molecules spin toward a direction to be perpendicular to the branch electrodes 271 and the branch portions 194 due to the horizontal electric field. Spinning displacement of liquid crystal molecules is greatest at the center between the two panels 100 and 200, and decreases toward (i.e. away from the center of) the two panels 100 and 200 due to the alignment force of alignment layers.

When liquid crystals spin on a plane parallel with the two panels 100 and 200, a wide viewing angle is obtained because a variation of retardation (Δnd) according to light passage is small.

A liquid crystal display according to an embodiment of the present invention shows a wide viewing angle even though no compensation film is used, has excellent side visibility without color shift, and has a more uniform response speed in the whole gray level. Accordingly, such a liquid crystal display is capable of effectively displaying a moving picture.

Now, a manufacturing method of the thin film diode array panel according to an embodiment of the present invention will be described.

Figure 4A:
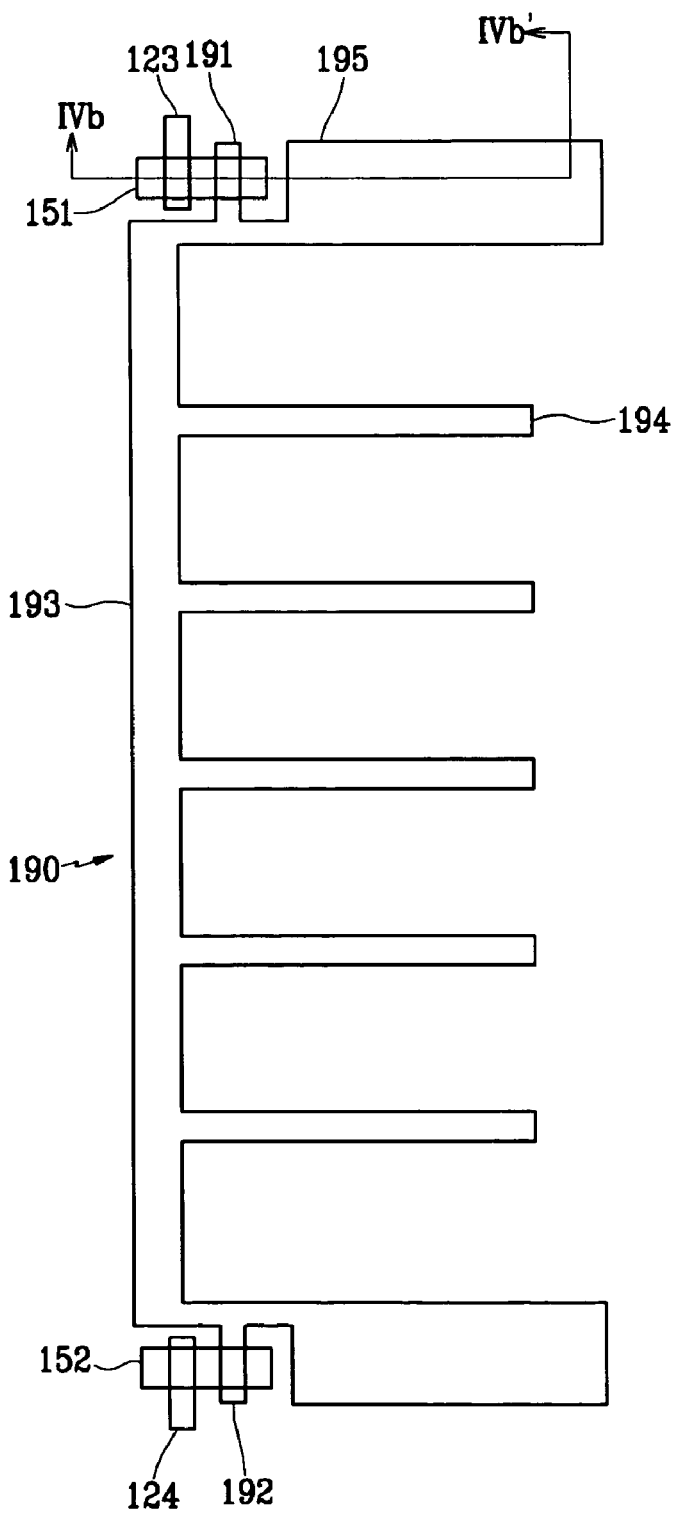
FIG. 4A is a layout view of the thin film diode array panel at a step of a manufacturing method thereof according to an embodiment of the present invention.
Figure 4B:
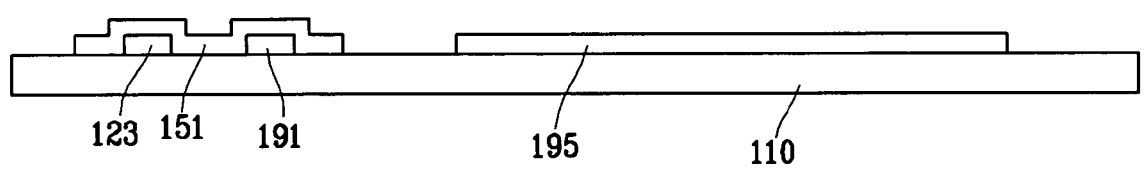
FIG. 4B is a sectional view of the thin film diode array panel taken along the line IVb-IVb' of FIG. 4A according to an embodiment of the present invention.
Figure 5A:
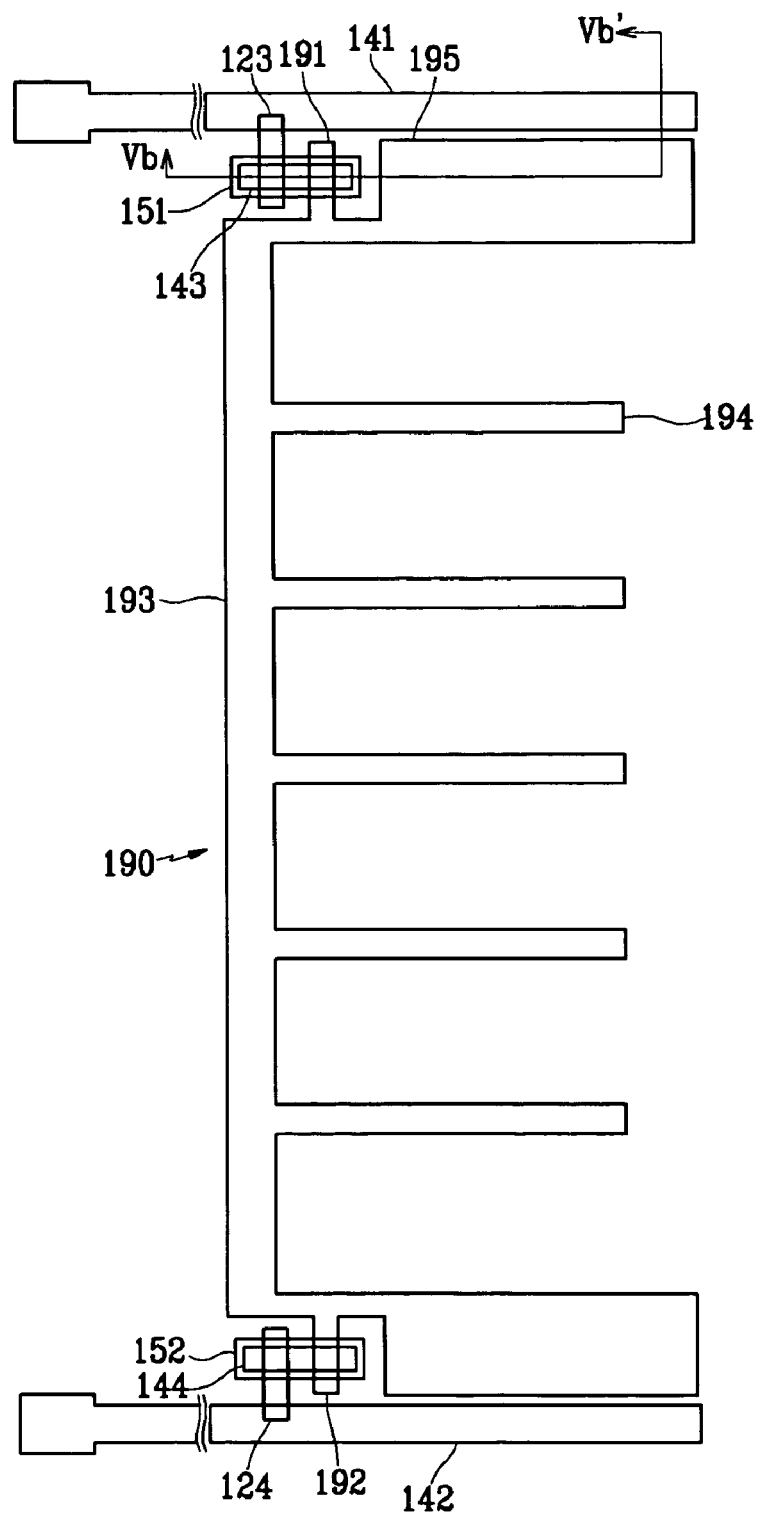
FIG. 5A is a layout view of the thin film diode array panel at another step of a manufacturing method thereof according to an embodiment of the present invention.
Figure 5B:
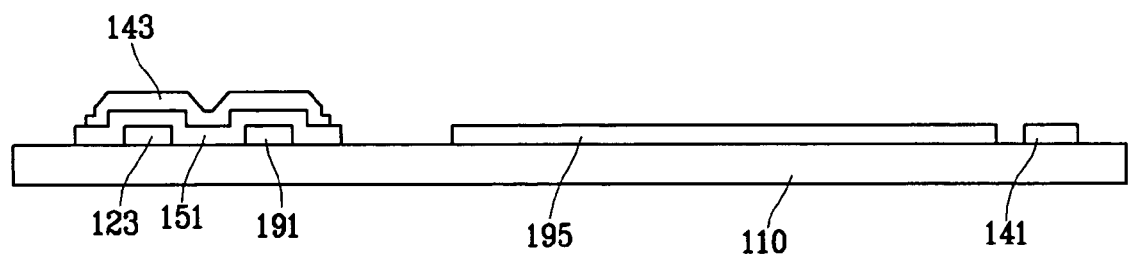
FIG. 5B is a sectional view of the thin film diode array panel taken along the line Vb-Vb' of FIG. 5A according to an embodiment of the present invention.

FIG. 4A is a layout view of the thin film diode array panel at a step of a manufacturing method thereof according to an embodiment of the present invention. FIG. 4B is a sectional view of the thin film diode array panel taken along the line IVb-IVb' of FIG. 4A. FIG. 5A is a layout view of the thin film diode array panel at another step of a manufacturing method thereof. FIG. 5B is a sectional view of the thin film diode array panel taken along the line Vb-Vb' of FIG. 5A.

As shown in FIGS. 4A and 4B, a transparent or opaque conductive material layer is formed on the insulating substrate 110 and is photo-etched to form the pixel electrodes 190 and the first and second input electrodes 123 is and 124.

Next, a silicon nitride layer is deposited and is photo-etched to form the first channel insulating layer 151 on the first input electrode 123 and the first contact portion 191 of the pixel electrode 190, and to form the second channel insulating layer 152 on the second input electrode 124 and the second contact portion 192 of the pixel electrode 190.

Next, as shown in FIGS. 5a and 5b, a metal layer of Mo, Al, Ta, Ti, or their alloys is deposited and is photo-etched to form the first and second floating electrodes 143 and 144 and the first and second scanning signal lines 141 and 142.

Next, an insulating layer made of an inorganic insulator such as SiNx and SiOx or an organic insulator such as resin is deposited and is photo-etched to form the inter-insulating layer 160 having contact holes 161 (see FIG. 2) to expose portions of the first and second scanning signal lines 141 and 142 for connecting to external circuits.

Next, as shown in FIGS. 2 and 3, a metal layer is photo-etched to form the data electrode lines 270 including the branch electrodes 271 and the storage electrodes 272.

In an embodiment, the thin film diode array panel is manufactured by using five photo-etching processes. Alternatively, a thin film diode array panel may be manufactured by using less photo-etching processes. Furthermore, the shape of the pixel electrode 190 and the branch electrode 271 may be modified. Such modifications will be described below.

Figure 6:
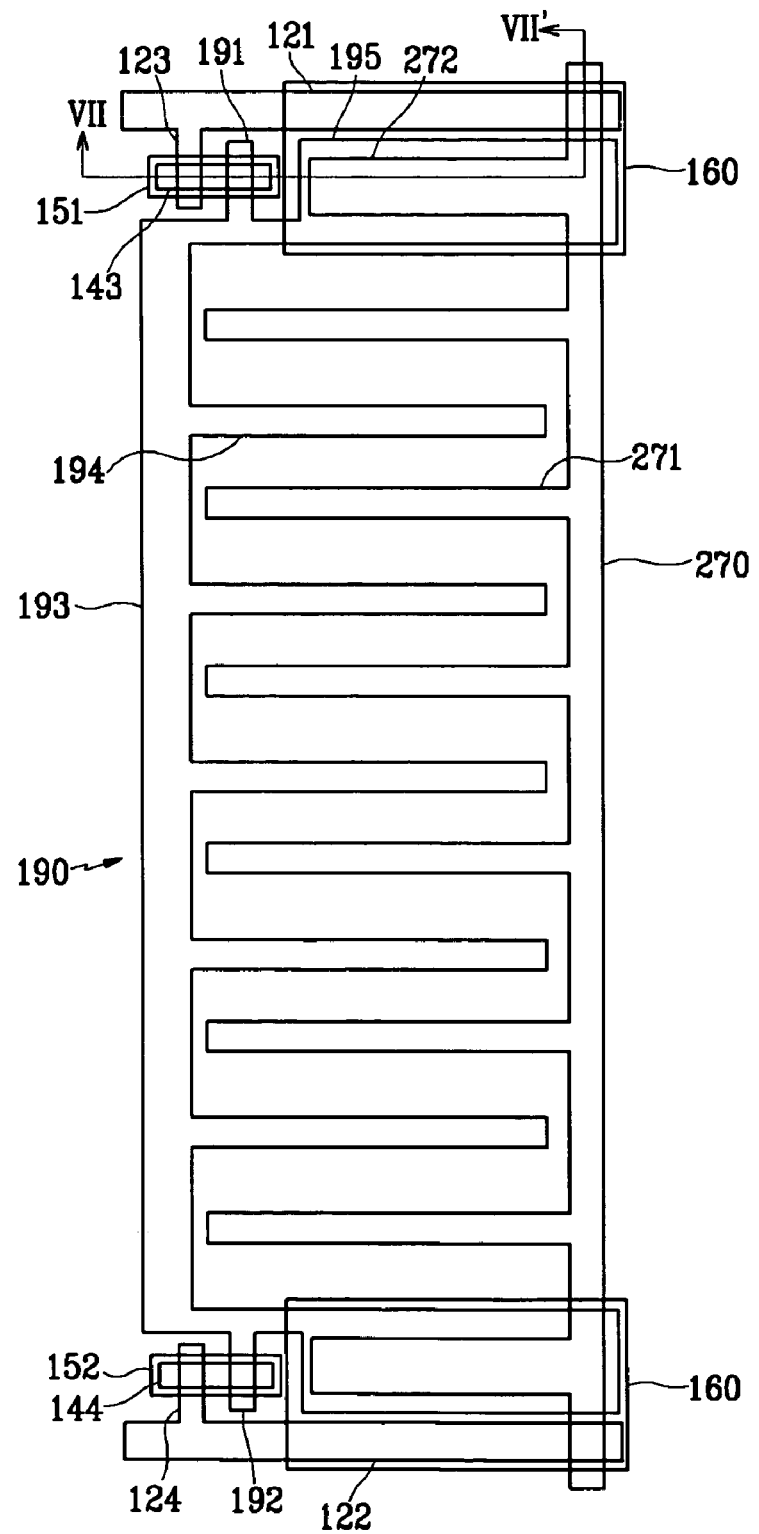
FIG. 6 is a layout view of a thin film diode array panel for a liquid crystal display according to an embodiment of the present invention.
Figure 7:
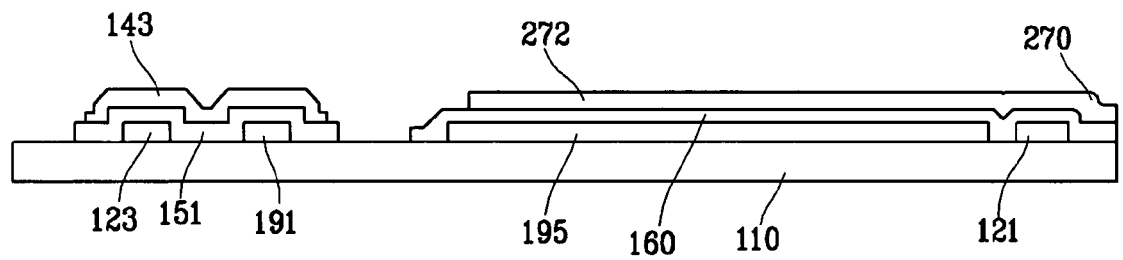
FIG. 7 is a sectional view of the thin film diode array panel taken along the line VII-VII' of FIG. 6 according to an embodiment of the present invention.

FIG. 6 is a layout view of a thin film diode array panel for a liquid crystal display according to an embodiment of the present invention, and FIG. 7 is a sectional view of the thin film diode array panel taken along the line VII-VII' of FIG. 6.

As shown in FIGS. 6 and 7, a plurality of pixel electrodes 190 having first and second contact portions 191 and 192 and first and second scanning signal lines 121 and 122 which are respectively connected with a first input electrode 123 and a second input electrode 124 are formed on a transparent insulating substrate 110 such as glass.

A pixel electrode 190 includes a stem portion 193 extended toward a longitudinal direction, branch portions 194 extended from the stem portion 193 and extended toward a transverse direction, and overlapping portions 195 extended from the stem portion 193, extended in a transverse direction, and having an increased width.

The first and second scanning signal lines 121 and 122 are substantially extended in a transverse direction. The first input electrode 123 is branched out from the first scanning signal line 121, and is extended in a longitudinal direction. The first input electrode 123 also is adjacent to the first contact portion 191 with a predetermined gap therebetween. The second input electrode 124 is branched out from the second scanning signal line 122, and is extended in a longitudinal direction. The second input electrode 124 also is adjacent to the second contact portion 192 with a predetermined gap therebetween.

The pixel electrode 190, the first and second scanning signal lines 121 and 122, and the first and second input electrodes 123 and 124 may be made of an opaque conductive material such as chromium (Cr), aluminum (Al), molybdenum (Mo), tantalum (Ta), and their alloys, as well as of a transparent conductive material such as indium-tin-oxide (ITO) and indium-zinc-oxide (IZO).

A plurality of first channel insulating layers 151 are locally formed on the first input electrodes 123 and the first contact portions 191. A plurality of second channel insulating layers 152 are locally formed on the second input electrodes 124 and the second contact portions 192. The first and second channel insulating layers 151 and 152 are made of an insulating material such as silicon nitride (SiNx).

An inter-insulating layer 160 is locally formed on the overlapping portion 195 of the pixel electrode 190 and portions of the first and second scanning signal lines 121 and 122. The inter-insulating layer 160 is for insulating the first and second scanning signal lines 121 and 122 from a data electrode line 270 which will be described below, and for insulating the overlapping portion 195 and a storage electrode 272 which will also be described below.

A plurality of first and second floating electrodes 143 and 144 are respectively formed on the first and second channel insulating layers 151 and 152. The first floating electrode 143 crosses the first input electrode 123 and the first contact portion 191. The second floating electrode 144 crosses the second input electrode 124 and the second contact portion 192.

A plurality of data electrode lines 270 are formed on the inter-insulating layer 160. The data electrode line 270 includes a plurality of branch electrodes 271 and storage electrodes 272.

The branch electrode 271 is disposed to be parallel with the branch portion 194 of the pixel electrode 190. The branch electrode 271 and the branch portion 194 are alternately disposed.

The storage electrode 272 overlaps the overlapping portion 195 of the pixel electrode 190 to form a storage capacitor.

A manufacturing method of the thin film diode array panel according to the embodiment described in connection with FIGS. 6 and 7 will be described.

A transparent or an opaque conductive material layer is formed on the insulating substrate 110 and is photo-etched to form the pixel electrodes 190, the first and second scanning signal lines 121 and 122, and the first and second input electrodes 123 and 124.

Next, a silicon nitride layer is deposited and is photo-etched to form the first channel insulating layer 151 on the first input electrode 123 and the first contact portion 191 of the pixel electrode 190 and to form the second channel insulating layer 152 on the second input electrode 124 and the second contact portion 192 of the pixel electrode 190.

Next, an insulating layer made of an inorganic insulator such as SiNx and SiOx or an organic insulator such as resin is deposited and is photo-etched to form the inter-insulating layer 160 covering portions of the first and second scanning signal lines 121 and 122 and the overlapping portion 195.

A metal layer made of, for example, chromium (Cr), aluminum (Al), molybdenum (Mo), tantalum (Ta), and their alloys is deposited and is photo-etched to form the first and second floating electrodes 143 and 144, the data electrode line 270, branch electrode 271, and storage electrode 272.

As described above, the thin film diode array panel according to the embodiment described in connection with FIGS. 6 and 7 is manufactured by using four photo-etching processes.

Figure 8:
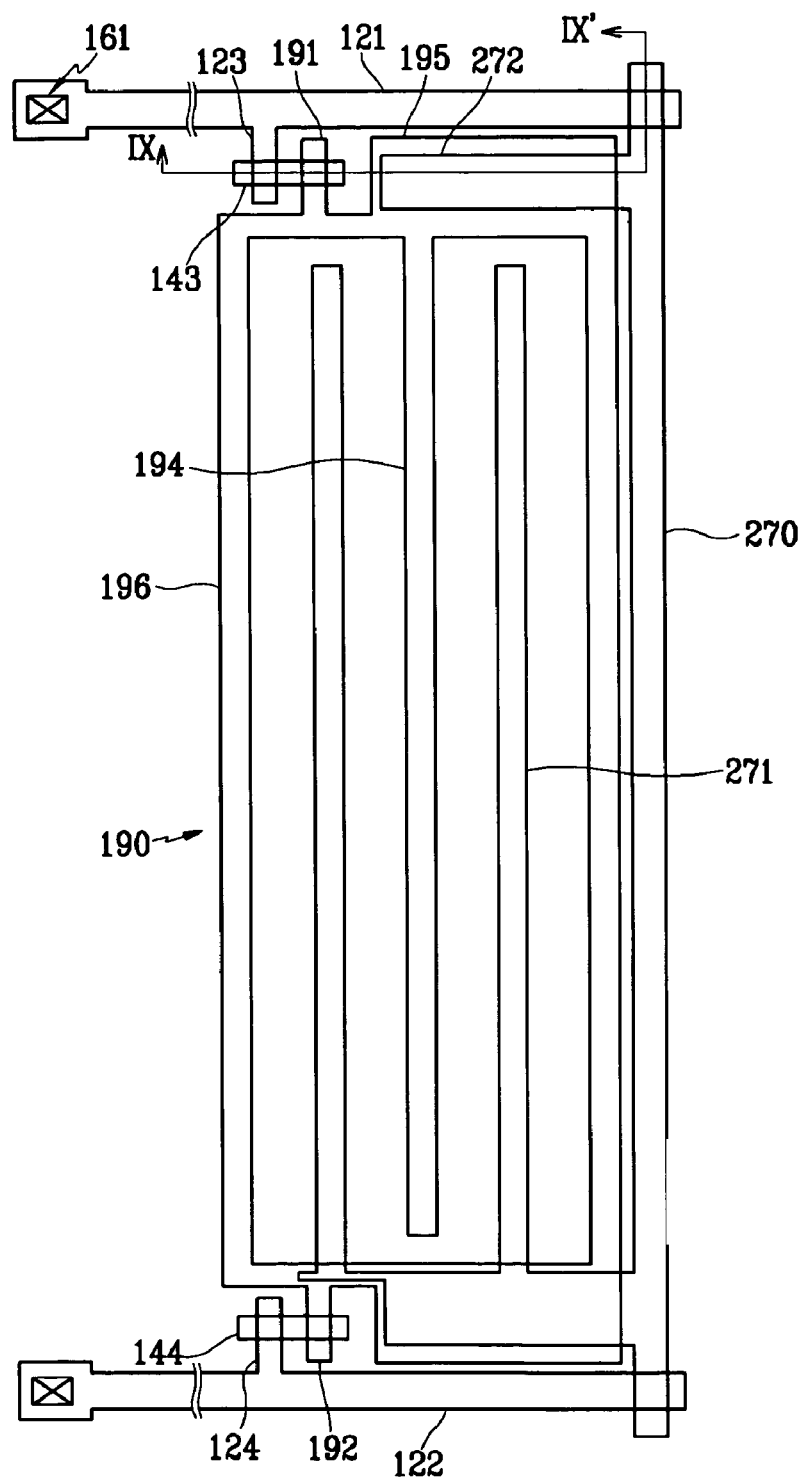
FIG. 8 is a layout view of a thin film diode array panel for a liquid crystal display according to an embodiment of the present invention.
Figure 9:
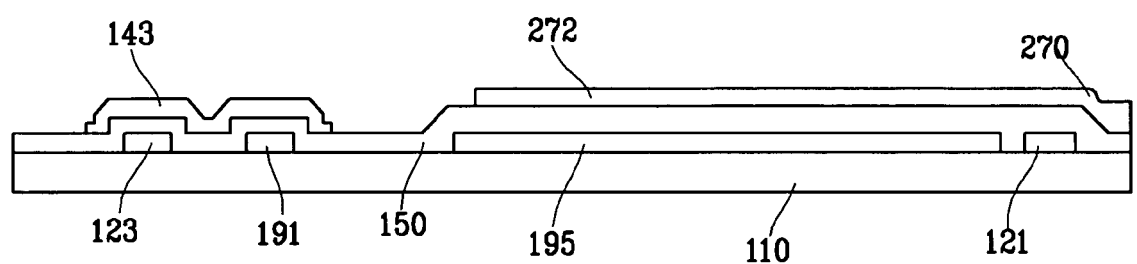
FIG. 9 is a sectional view of the thin film diode array panel taken along the line IX-IX' of FIG. 8 according to an embodiment of the present invention.

FIG. 8 is a layout view of a thin film diode array panel for a liquid crystal display according to an embodiment of the present invention, and FIG. 9 is a sectional view of the thin film diode array panel taken along the line IX-IX' of FIG. 8 according to an embodiment of the present invention.

As shown in FIGS. 8 and 9, a plurality of pixel electrodes 190 having first and second contact portions 191 and 192 and first and second scanning signal lines 121 and 122 which are respectively connected with a first input electrode 123 and a second input electrode 124 are formed on a transparent insulating substrate 110 such as glass.

The pixel electrode 190 further includes a frame portion 196 having a rectangular shape, branch portions 194 extended from the frame portion 196 in a longitudinal direction, and overlapping portions 195 formed by expansion of the frame portion 196.

The first and second scanning signal lines 121 and 122 are substantially extended in a transverse direction. The first input electrode 123 is branched out from the first scanning signal line 121, and is extended in a longitudinal direction. The first input electrode 123 is adjacent to the first contact portion 191 with a predetermined gap therebetween. The second input electrode 124 is branched out from the second scanning signal line 122, and is extended in a longitudinal direction. The second input electrode 124 is adjacent to the second contact portion 192 with a predetermined gap therebetween.

The pixel electrode 190, the first and second scanning signal lines 121 and 122, and the first and second input electrodes 123 and 124 may be made of an opaque conductive material such as chromium (Cr), aluminum (Al), molybdenum (Mo), tantalum (Ta), and their alloys as well as a transparent conductive material such as indium-tin-oxide (ITO) and indium-zinc-oxide (IZO).

An insulating layer 150 made of an insulating material such as SiNx is formed on the insulating substrate 110 to cover the pixel electrode 190, the first and second scanning signal lines 121 and 122, and the first and second input electrodes 123 and 124.

The thickness of the insulating layer 150 in most areas, including upper portions of the first input electrode 123, the contact portion 191, and the second input electrode 124, is thinner than that in other areas, including the crossing portion of a data electrode line 270 and the first and second scanning signal lines 121 and 122, and the overlapping portion of the overlapping portion 195 and a storage electrode 272, which will be described below. With this structure, the insulating layer 150 is capable of functioning as both a channel insulating layer of an MIM diode and an insulator between conductors.

The insulating layer 150 includes contact holes 161 exposing portions of the first and second scanning signal lines 121 and 122 for connecting with external circuits.

A plurality of first and second floating electrodes 143 and 144 are respectively formed on the insulating layer 150. The first floating electrode 143 crosses the first input electrode 123 and the first contact portion 191. The second floating electrode 144 crosses the second input electrode 124 and the second contact portion 192.

A plurality of data electrode lines 270 are formed on the insulating layer 150 and extend in a longitudinal direction. The data electrode line 270 includes a plurality of storage electrodes 272 and branch electrodes 271 which branch out from one of the storage electrodes 272 and extend in a longitudinal direction.

Referring to FIG. 8, the branch electrodes 271 are formed to be parallel with the branch portion 194 of the pixel electrode 190, to have a predetermined distance from the branch portion 194 and the frame portion 196, and to be disposed between the branch portion 194 and the frame portion 196.

The storage electrode 272 overlaps the overlapping portion 195 of the pixel electrode 190 to form a storage capacitor.

A manufacturing method of the thin film diode array panel according to an embodiment will now be described.

A transparent or an opaque conductive material layer is formed on the insulating substrate 110 and is photo-etched to form the pixel electrodes 190, the first and second scanning signal lines 121 and 122, and the first and second input electrodes 123 and 124.

Next, a silicon nitride layer is deposited and is photo-etched to form the insulating layer 150 having contact holes 161, where the thickness of the insulating layer 150 in most areas, including upper portions of the first input electrode 123, the contact portion 191, the second input electrode 124, and the contact portion 191, is thinner than that in other areas, including the crossing portion of a data electrode line 270 and the first and second scanning signal lines 121 and 122, and the overlapping portion of the overlapping portion 195 and a storage electrode 272.

Half tone light exposing is employed to form the insulating layer 150. That is, a photoresist film is coated on the insulating layer 150 to have a thickness of 1 μm, it is exposed to light through a mask with a slit or lattice pattern or through a semitransparent film, and is developed such that the photoresist film portion at the area of contact holes 161 is entirely removed while exposing the insulating layer 150. The photoresist film portion at the area of the insulating layer 150 having a small thickness is left over with a small thickness, and the photoresist film portion at the area of the insulating layer 150 having a large thickness is left over with a large thickness.

When using a half tone mask, a light transparent area and light blocking area of the half tone mask may be exchanged with each other depending on the type of photoresist used.

The insulating layer 150 is etched to form the contact hole 161 using the photoresist film.

Next, the photoresist film is ashed to remove the small thickness portion of the photoresist film. After that, the insulating layer 150 is etched again to reduce the thickness of the insulating layer 150.

A metal layer made of, for example, chromium (Cr), aluminum (Al), molybdenum (Mo), tantalum (Ta), and their alloys is deposited on the insulating layer 150 and is photo-etched to form the first and second floating electrodes 143 and 144, the data electrode line 270, branch electrode 271, and storage electrode 272.

As described above, the thin film diode array panel according to the embodiment described in connection with FIGS. 8 and 9 is manufactured by using three photo-etching processes including a half-tone exposure.

Figure 10:
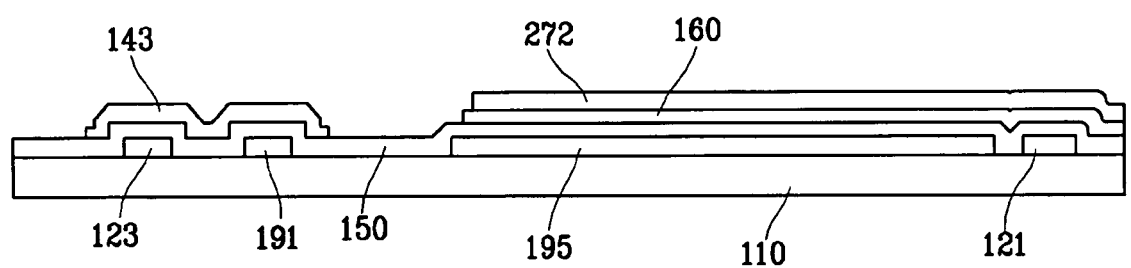
FIG. 10 is a sectional view of the thin film diode array panel taken along the line IX-IX' of FIG. 8 according to an embodiment of the present invention.

FIG. 10 is a sectional view of the thin film diode array panel shown in FIG. 8 taken along the line IX-IX' according to an embodiment of the present invention.

As shown in FIG. 10, a plurality of pixel electrodes 190 having first and second contact portions 191 and 192 and first and second scanning signal lines 121 and 122 which are respectively connected with a first input electrode 123 and a second input electrode 124 are formed on a transparent insulating substrate 110 such as glass.

The pixel electrode 190, the first and second scanning signal lines 121 and 122, and the first and second input electrodes 123 and 124 may be made of an opaque conductive material such as chromium (Cr), aluminum (Al), molybdenum (Mo), tantalum (Ta), and their alloys, as well as of a transparent conductive material such as indium-tin-oxide (ITO) and indium-zinc-oxide (IZO).

A basic insulating layer 150 made of SiNx is formed on the insulating substrate 110 to cover the pixel electrode 190, the first and second scanning signal lines 121 and 122, and the first and second input electrodes 123 and 124. The basic insulating layer 150 has a plurality of contact holes 161 to expose portions of the first and second scanning signal lines 121 and 122 to connect to external circuits.

A subsidiary insulating layer 160 is regionally formed on the basic insulating layer 150. As will be described below, the subsidiary insulating layer 160 is disposed between the first and second scanning signal lines 121 and 122 and the data electrode line 270, and between the overlapping portion 195 and the storage electrode 272. The subsidiary insulating layer 160 ensures insulation of inter-layers if the basic insulating layer 150, functioning as a MIM diode channel, is not sufficient to insulate the inter-layers.

A plurality of first and second floating electrodes 143 and 144 are formed on the basic insulating layer 150.

A plurality of data electrode lines 270, and storage electrodes 272 and branch electrodes 271 connected to the data electrode lines 270 are formed on the subsidiary insulating layer 160. The storage electrode 272 overlaps the overlapping portion 195 of the pixel electrode 190 to form a storage capacitor.

In the above described embodiments, insulation between the data electrode line 270 and the first and second scanning signal lines 121 and 122 and between the storage electrode 272 and overlapping portion 195 is ensured by using one of the following three methods. One alternative is using a different insulating layer from the channel insulating layer of the MIM diode. Another alternative is controlling the insulating layer to be thicker at the crossing or overlapping portions than at the remaining portions. The other alternative is forming a subsidiary insulating layer.

However, a channel insulating layer itself may be sufficient to insulate between the data electrode line 270 and the first and second scanning signal lines 121 and 122, and between the storage electrode 272 and the overlapping portion 195, since a threshold voltage of the MIM diode channel is much higher than the highest voltage that may applied between the data electrode line 270 and the first and second scanning signal lines 121 and 122 and between the storage electrode 272 and the overlapping portion 195. The threshold voltage of the MIM diode is about 20V, but the highest voltage applied between the data electrode line 270 and the first and second scanning signal lines 121 and 122 and between the storage electrode 272 and overlapping portion 195 is about 10V. These factors are considered in the following embodiment.

Figure 11:
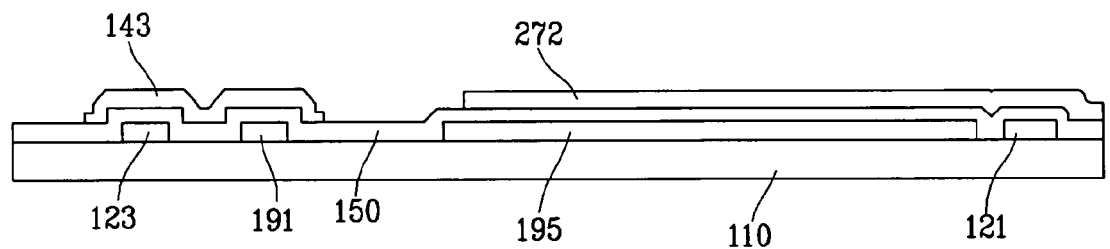
FIG. 11 is a sectional view of the thin film diode array panel taken along the line IX-IX' of FIG. 8 according to an embodiment of the present invention.

FIG. 11 is a sectional view of the thin film diode array panel shown in FIG. 8 taken along the line IX-IX' according to a an embodiment of the present invention.

The embodiment shown in FIG. 11 has a structure in which the subsidiary insulating layer is removed from the embodiment shown in FIG. 10.

Structures of thin film diode array panels are described above in accordance with embodiments of the present invention. The following embodiments of the present invention illustrate modifications to layouts of electrodes.

Figure 12:
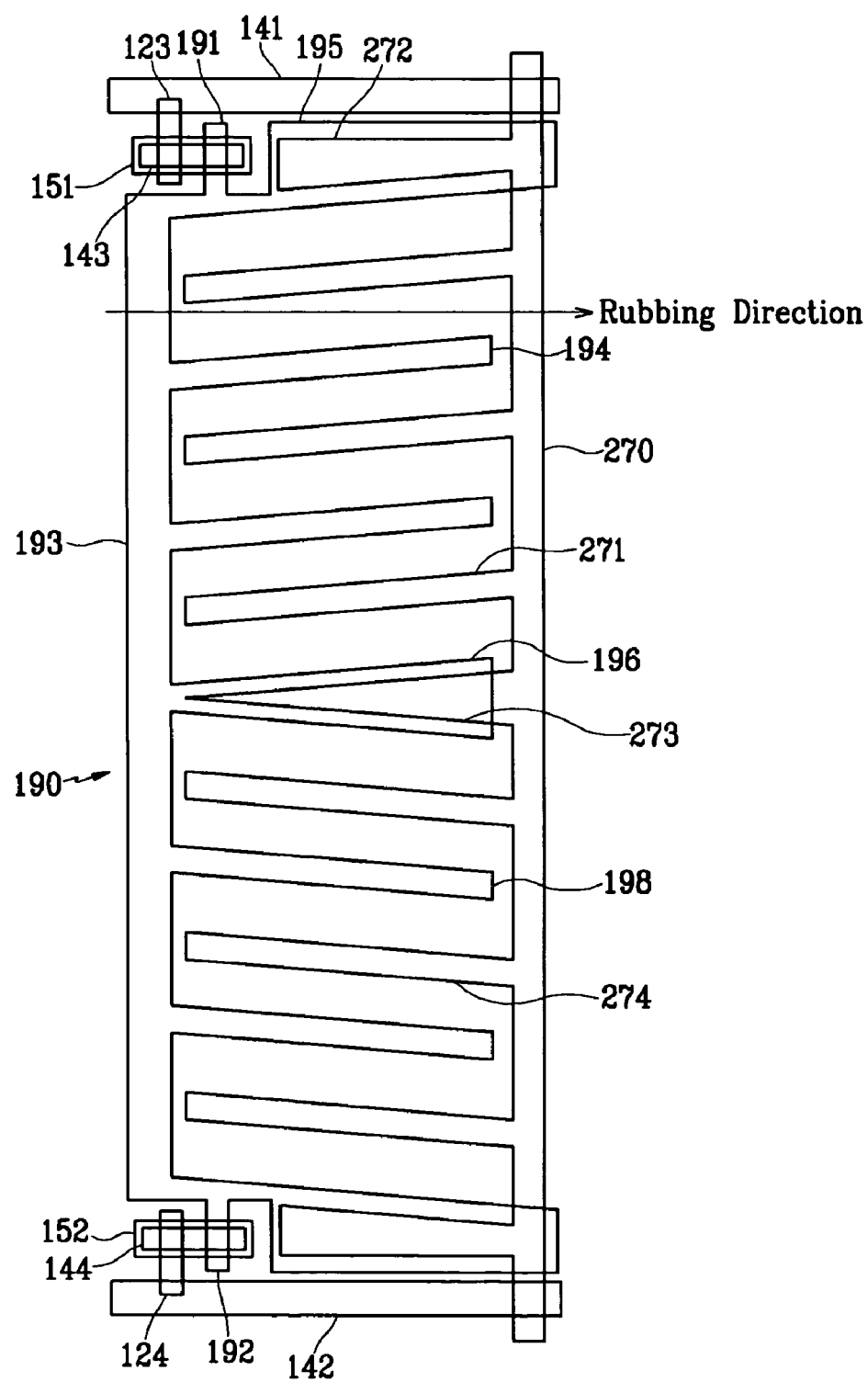
FIG. 12 is a layout view of a thin film diode array panel for a liquid crystal display according to an embodiment of the present invention.

FIG. 12 is a layout view of a thin film diode array panel for a liquid crystal display according to an embodiment of the present invention.

Referring to FIG. 12, the pixel electrode 190 includes a stem portion 193 extended in a longitudinal direction, and upper branch portions 194 branched out from the stem portion 193 and making an angle ranging from about 7 degrees to about 23 degrees with respect to the transverse axis of the scanning signal lines 141 and 142. Lower branch portions 198 are branched out from the stem portion 193 and make an angle ranging from about −23 degrees to about −7 degrees with respect to the transverse axis of the scanning signal lines 141 and 142 (here, the symbol, '−', means that the lower branch portions 198 are slanted in a direction opposite that of the upper branch portions 194). The pixel electrode also includes a center overlapping portion 196 extended in a transverse direction and having a widening width in a direction away from the stem portion 193, and upper and lower overlapping portions 195 extended in a transverse direction and having a narrowing width in a direction away from the stem portion 193. The distances between the adjacent branch portions 194 and 198 are substantially the same. The distances between the upper and lower overlapping portions 195 and the center overlapping portion 196 are substantially the same.

The branch electrodes 271 and 274 are formed to be parallel with the branch portions 194 and 198, respectively, of the pixel electrode 190, and are disposed between the adjacent branch portions 194 and 198 and the overlapping portions 195 and 196.

The storage electrodes 272 and 273 connected to the data electrode line 270 overlap the overlapping portions 195 and 196 of the pixel electrode 190 to form storage capacitors.

The rubbing direction of an alignment layer formed on the thin film diode array panel is shown by the arrow.

As described above, when the branch portions 194 and 198 of the pixel electrode 190 and the branch electrodes 271 and 274 are formed to be slanted against the rubbing direction, the alignment directions of liquid crystals cross with the horizontal electric field formed between the branch portions 194 and 198 of the pixel electrode 190 and the branch electrodes 271 and 274. As a result, a color shift of right and left sides and reverse turning of gray can be prevented from occurring.

Furthermore, when the rubbing direction is parallel with the scanning signal lines 141 and 142, the liquid crystals are aligned to be parallel with the scanning signal lines 141 and 142. That is, when no electric field is applied, the long axes of the liquid crystals are perpendicular to the data electrode line 270 and the stem portion 193 of the pixel electrode 190. Therefore, a cross talk phenomenon exhibited in side viewing, which is light leakage arising from rearrangement of the liquid crystals due to the electric field formed between, for example, the stem portion 193 and the data electrode line 270, is prevented. Cross talk is prevented because the alignment direction of liquid crystals is not changed, since the liquid crystals are originally aligned in the same direction as the electric field formed between the stem portion 193 and the data electrode line 270.

Only one disclination line, which arises on the portion of the liquid crystal that changes alignment, is exhibited in a pixel because the liquid crystal alignment is changed only once on the center overlapping portion 196 of the pixel electrode 190.

Figure 13:
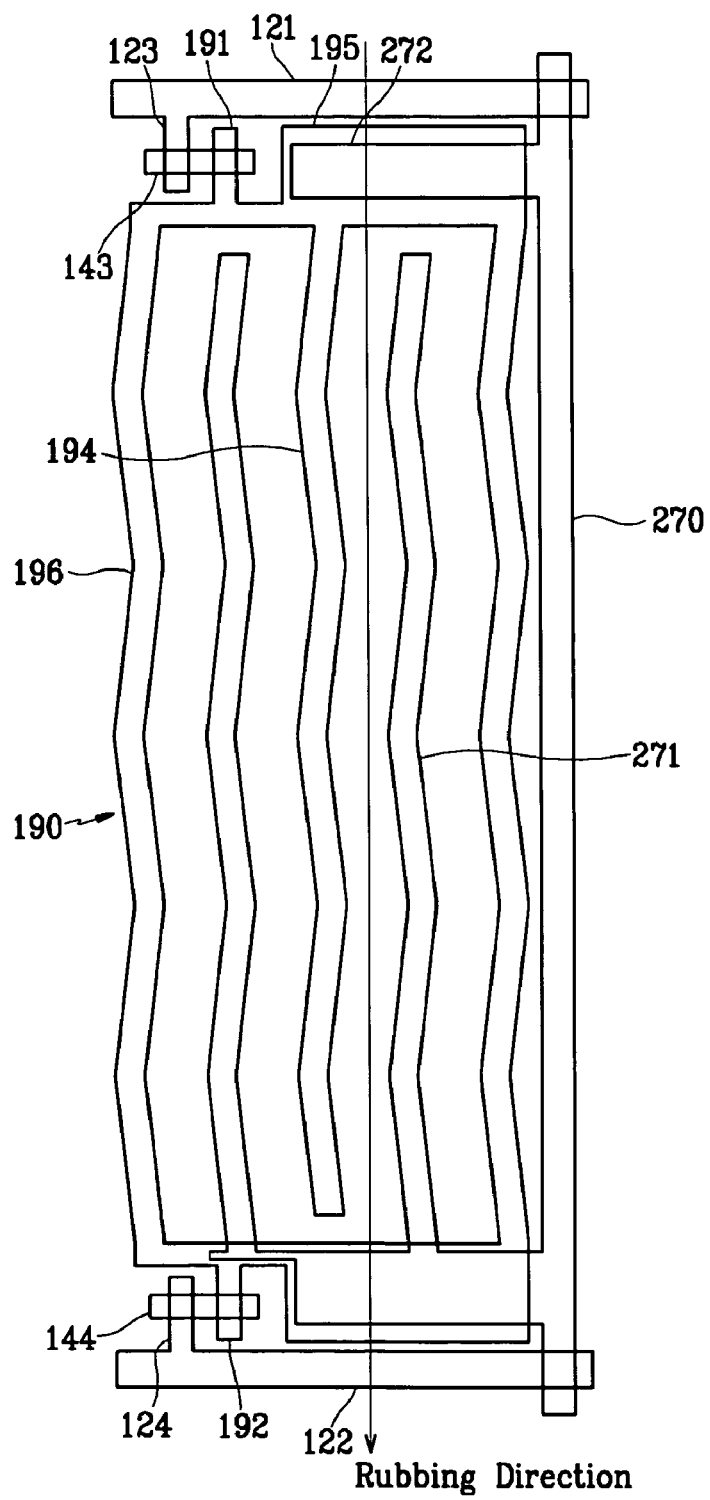
FIG. 13 is a layout view of a thin film diode array panel for a liquid crystal display according to an embodiment of the present invention.

FIG. 13 is a layout view of a thin film diode array panel for a liquid is crystal display according to an embodiment of the present invention.

Referring to FIG. 13, the frame portion 196 and the branch portion 194 of the pixel electrode 190, and the branch electrode 271 of the data electrode line 270 are formed to be periodically bent in order for the alignment directions of the liquid crystals to cross the horizontal electric field in a slant manner. As shown in FIG. 13, a frame portion 196, branch portion 194 and branch electrodes 271 each include a plurality of adjacent bent sections. The angle of a bent section on the frame portion 196, the branch portion 194, and the branch electrode 271 ranges from about 15 degrees to about 45 degrees with respect to an axis formed by an adjacent bent section. Therefore, the angle formed between the two adjacent bent sections ranges from about 135 degrees to about 165 degrees (i.e., about (180-45) degrees to about (180-15) degrees).

The rubbing direction of the alignment layer formed on the thin film diode array panel is along the data electrode line 270 as shown by the arrow.

As described above, when the branch portion 194 and the frame portion 196 of the pixel electrode 190 and the branch electrodes 271 are formed to be slanted against the rubbing direction, the alignment directions of liquid crystals cross with the horizontal electric field formed between the branch portion 194, frame portion 196, and the branch electrode 271. As a result, a color shift of right and left sides and reverse turning of gray can be prevented from occurring.

A liquid crystal display according to embodiments of the present invention shows a wide enough viewing angle even though no compensation film is used, excellent side visibility without a color shift, and a more uniform response speed in the whole gray level. Accordingly, such a liquid crystal display has is capable of effectively displaying a moving picture.

Although the illustrative embodiments have been described herein with reference to the accompanying drawings, it is to be understood that the present invention is not limited to those precise embodiments, and that various changes and modifications may be affected therein by one of ordinary skill in the related art without departing from the scope or spirit of the invention. All such changes and modifications are intended to be included within the scope of the invention as defined by the appended claims.

What is claimed is:

1. A panel for a liquid crystal display device, comprising:
a pixel electrode formed on a substrate, the pixel electrode including first and second contact portions, a stem portion, a plurality of branch portions extended from the stem portion;
a data electrode line formed on the substrate, the data electrode line including a plurality of branch electrodes aligned parallel to the plurality of branch portions;
a first input electrode formed on the substrate adjacent the first contact portion;
a second input electrode formed on the substrate adjacent the second contact portion;
a first floating electrode formed on the substrate, wherein the first floating electrode crosses the first input electrode and the first contact portion;
a second floating electrode formed on the substrate, wherein the second floating electrode crosses the second input electrode and the second contact portion;
a first scanning signal line formed on the substrate, wherein a portion of the first input electrode overlaps the first scanning signal line and the first input electrode is electrically connected to the first scanning signal line;
a second scanning signal line formed on the substrate, wherein a portion of the second input electrode overlaps the second scanning signal line and the second input electrode is electrically connected to the second scanning signal line, and
an inter-insulating layer formed on the first and second floating electrodes, the pixel electrode, the first and second input electrodes and the first and second scanning signal lines.

2. The panel as recited in claim 1, wherein each branch portion of the plurality of branch portions is alternately disposed with a branch electrode of the plurality of branch electrodes.

3. The panel as recited in claim 1, further comprising:
a first channel insulating layer disposed between the first floating electrode and the first input electrode and the first contact portion; and
a second channel insulating layer disposed between the second floating electrode and the second input electrode and the second contact portion.

4. The panel as recited in claim 3, wherein:
the first channel insulating layer, the first floating electrode, the first input electrode and the first contact portion form a first MIM diode;
the second channel insulating layer, the second floating electrode, the second input electrode and the second contact portion form a second MIM diode; and
the first and second MIM diodes are symmetrically connected to the pixel electrode.

5. The panel as recited in claim 1, wherein the data electrode line is formed on the inter-insulating layer.

6. The panel as recited in claim 1, wherein the inter-insulating layer includes a plurality of contact holes for exposing portions of the first and second scanning signal lines.

7. The panel as recited in claim 1, wherein:
the pixel electrode further includes an overlapping portion extended from the stem portion;
the data electrode line further includes a storage electrode connected thereto; and
the storage electrode overlaps the overlapping portion to form a storage capacitor.

8. The panel as recited in claim 7, wherein an inter-insulating layer is disposed between the storage electrode and the overlapping portion.

9. The panel as recited in claim 1, wherein the plurality of branch portions extend in a direction perpendicular to the stem portion and the plurality of branch electrodes extend in a direction perpendicular to the data electrode line.

10. The panel as recited in claim 9, wherein the stem portion extends in a longitudinal direction.

11. A panel for a liquid crystal display device, comprising:
a pixel electrode formed on a substrate, the pixel electrode including first and second contact portions, a stem portion and a plurality of branch portions extended from the stem portion;
a data electrode line formed on the substrate, the data electrode line including a plurality of branch electrodes aligned parallel to the plurality of branch portions;
a first input electrode formed on the substrate adjacent the first contact portion;
a second input electrode formed on the substrate adjacent the second contact portion;
a first floating electrode formed on the substrate, wherein the first floating electrode crosses the first input electrode and the first contact portion;
a second floating electrode formed on the substrate, wherein the second floating electrode crosses the second input electrode and the second contact portion;
a first scanning signal line formed on the substrate, wherein the first input electrode branches out from the first scanning signal line;
a second scanning signal line formed on the substrate, wherein the second input electrode branches out from the second scanning signal line; and
an inter-insulating layer formed on an overlapping portion of the pixel electrode and portions of the first and second scanning signal lines.

12. The panel as recited in claim 11, wherein the data electrode line is formed on the inter-insulating layer.

* * * * *